United States Patent
Gunkel

3,766,775
Oct. 23, 1973

[54] ULTRASONIC INSPECTION SYSTEM

[76] Inventor: Walter A. Gunkel, 6515 Moss Oak, San Antonio, Tex. 78229

[22] Filed: Feb. 22, 1971

[21] Appl. No.: 117,676

[52] U.S. Cl. ............................................. 73/67.8 S
[51] Int. Cl. .......................................... G01n 29/04
[58] Field of Search.................. 73/67.7, 67.8, 67.9, 73/71.5

[56] References Cited
UNITED STATES PATENTS

| | | | |
|---|---|---|---|
| 3,111,027 | 11/1963 | Moffatt et al. | 73/67.8 |
| 3,169,393 | 2/1965 | Stebbins | 73/67.9 |
| 3,226,976 | 1/1966 | Wood et al. | 73/67.9 |
| 3,375,706 | 4/1968 | Pandelis et al. | 73/67.9 |
| 3,570,279 | 3/1971 | Davies | 73/67.9 |
| 3,584,504 | 6/1971 | Proctor | 73/67.9 |

FOREIGN PATENTS OR APPLICATIONS

1,390,463   1/1965   France ............................... 73/67.8

*Primary Examiner*—Richard C. Queisser
*Assistant Examiner*—John P. Beauchamp
*Attorney*—Hyer, Eickenroht, Thompson & Turner

[57] ABSTRACT

A system for the ultrasonic inspection of metal objects is disclosed in which an object such as a pipe end is inspected simultaneously in adjacent parallel sections by a plurality of ultrasonic transducers, and the output of each of these transducers is converted to an electric signal proportional to the thickness of the object being tested adjacent the transducer. The outputs of all the transducers are combined in one instance to provide a recordable indication, such as on a chart recorder, of the electrical signal relating to the output of the transducer adjacent the thinnest wall of the member being inspected. The outputs of each of the transducers are also conducted to a second recording mechanism, which also is preferably a chart recorder. The recorder has one channel for each transducer, and each channel indicates the presence of a discontinuity of a predetermined magnitude. Means are provided for correlating the information concerning the wall thickness of the object being inspected and the information concerning the presence of a discontinuity of any one channel to provide information concerning location, depth and size of a flaw. The whole system may be provided on a portable stand for insertion into a pipe end to be inspected and a portable console to facilitate the inspection of large diameter pipe.

9 Claims, 8 Drawing Figures

3,766,775

PATENTED OCT 23 1973

WALTER A. GUNKEL
INVENTOR.

BY Hyer, Eckenroht,
Thompson + Turner

ATTORNEYS

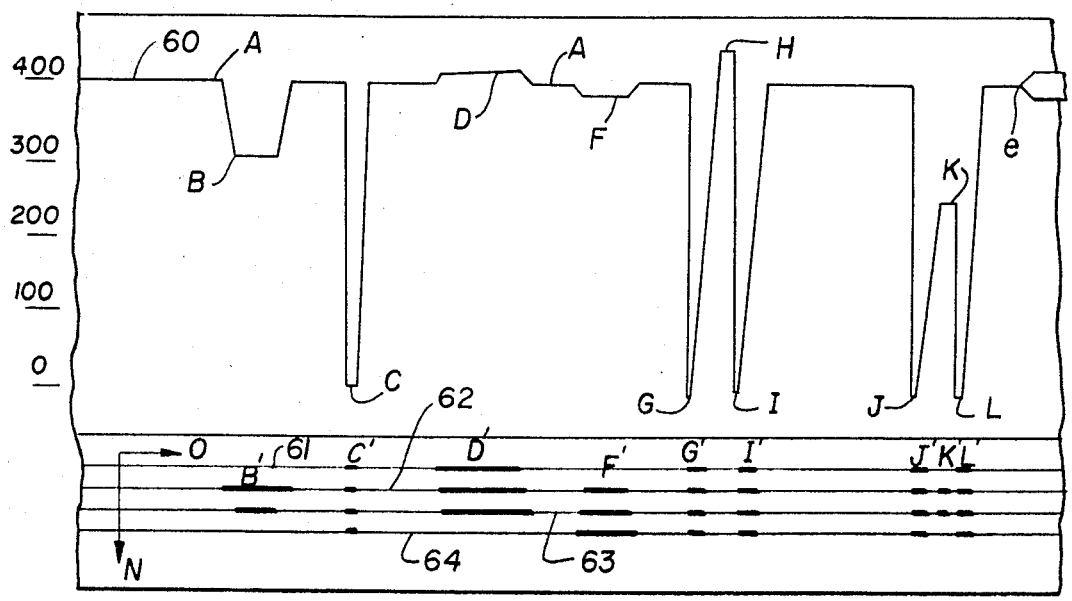
Fig-6
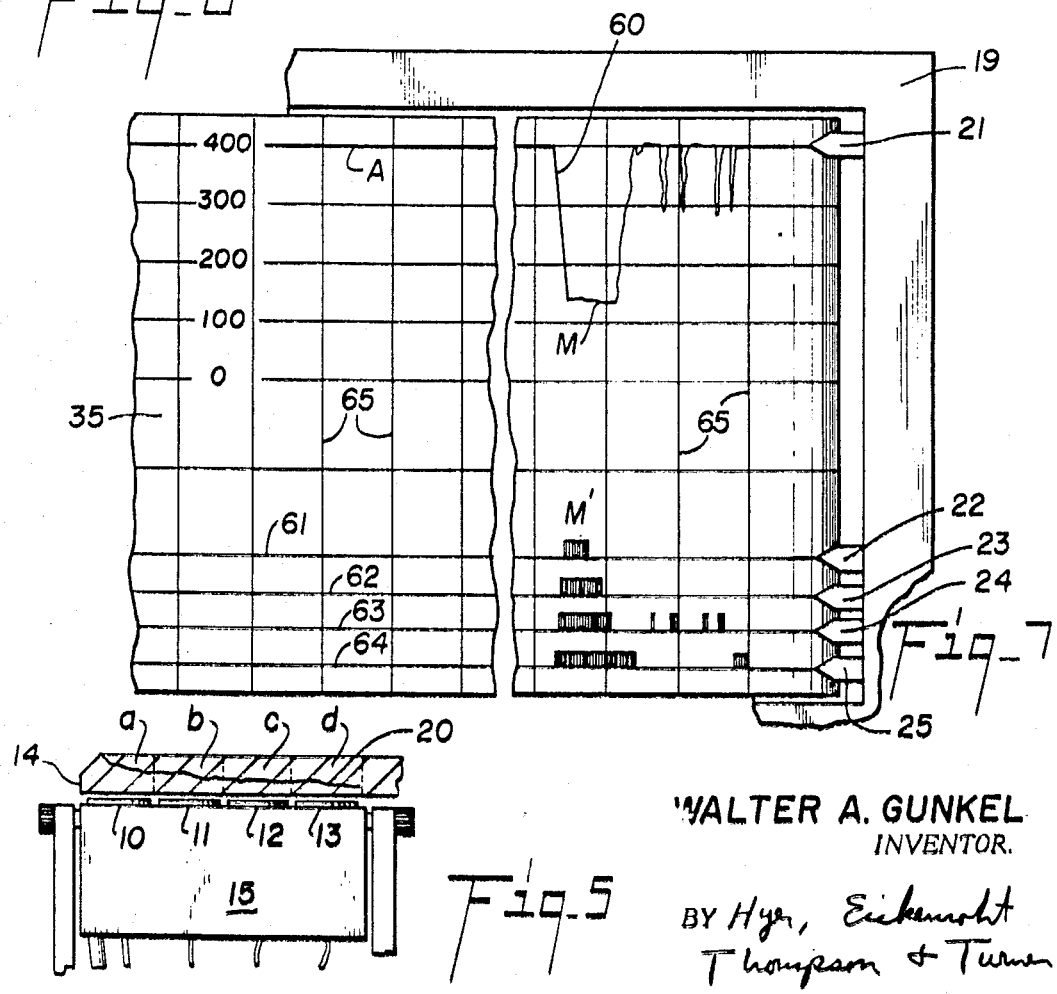
Fig-7
Fig-5
WALTER A. GUNKEL
INVENTOR.
BY Hyer, Eickenroht Thompson & Turner
ATTORNEYS

ULTRASONIC INSPECTION SYSTEM

This invention relates to a system for ultrasonic inspection of objects to determine the presence of a discontinuity, and in one of its aspects to such a system which is particularly adaptable for nondestructive testing of the ends of pipe, such as natural gas transmission line pipe.

Nondestructive ultrasonic testing is a well-known means of determining the presence of discontinuities in solid objects, particularly tubular or cylindrical goods. One of the problems with prior systems of ultrasonic inspection had been that they present the data in a form that requires a highly trained and experienced operator to determine the true result. In these systems, if the data is presented in a better and more usable form, the systems themselves can become very complex and expensive. Also, a number of these prior systems provide for only the determination of one function, such as wall thickness measurement.

In the inspection of tubular goods, it has been common to provide an inspection rack with suitable transducers mounted thereon, and the tubular goods to be inspected are moved to and from the rack. The pipe is rotated, and the transducers remain stationary. This is a tedious and expensive operation and can result in damage to the pipe. This is a particular nuisance when only the pipe ends are being inspected, and there has been a need for a device which is particularly suitable for the inspection of pipe ends.

It is thus an object of this invention to provide an ultrasonic inspection system which provides, in a single graphical display, information concerning the size, location and depth of a discontinuity in the object to be inspected.

It is another object of this invention to provide such an inspection system in which adjacent bands or sections of a device being inspected can be inspected simultaneously by a plurality of transducers, and the information from the transducers correlated to provide information concerning the depth and location of a discontinuity.

It is another object of this invention to provide such a system which provides relatively better accuracy and repeatability of results without the necessity of employing complex and costly components.

It is another object of this invention to provide such a system which is particularly adaptable for use in the inspection of tubular pipe ends.

It is another object of this invention to provide such a system for pipe inspection which may be performed while the pipe is in a racked condition in the pipe yard thus eliminating the need for pipe handling and reducing the cost of inspection and damage to pipe resulting from such handling.

These and other objects of this invention are accomplished by providing an ultrasonic inspection device including a plurality of transducers each of which simultaneously inspects one of a plurality of adjacent sections of an object being inspected to provide information concerning a condition of the object, such as the wall thickness, in each of said sections. In the preferred form of this invention, the information obtained concerning each of the sections is displayed together on a graphical record to provide a graphical representation as to the condition of the object in the adjacent sections being inspected at any point along the object. This is preferably accomplished by obtaining an electrical signal from each of the transducers, which is proportional to the thickness of the object being inspected in the corresponding adjacent section of the transducer, and combining these signals to obtain on one graphical display a continuous readout of either the smallest of these signals, representing the thinnest wall of the object being inspected, which is encountered by the transducer at any one inspection time, or the largest of these signals representing a thicker than normal wall thickness. Also, each of the electrical signals can be utilized to give separate graphical displays of the occurrence of abnormal conditions in each of the adjacent sections being inspected, and this information can be correlated with the graphical display of the wall thickness by, for example, displaying this information together on a single multichannel recorder.

A further aspect of this invention is that simultaneous inspection can be provided in a plurality of adjacent circumferential bands of a pipe which facilitate the inspection of a small section of the pipe, such as a pipe end. Also, the transducers performing this inspection can be supported in the pipe on a portable stand which permits the inspection apparatus to be easily transported and placed in a pipe, the ends of which are to be inspected. Also, the transducers are rotated about the pipe, and the pipe is not rotated.

In the drawings, where like reference numerals are used throughout to designate like parts, FIG. 1 is a block diagram of a preferred arrangement of the ultrasonic inspection system of this invention;

FIG. 5 is an enlarged view of a portion of the apparatus of FIG. 3 and the pipe being inspected illustrating the arrangement of transducers for inspecting adjacent sections of the pipe;

FIG. 6 is a graphical illustration of the results obtained by use of this invention; and FIG. 7 is another graphical illustration showing actual test results obtained on a chart recorder by use of the system of this invention.

Figure 1:
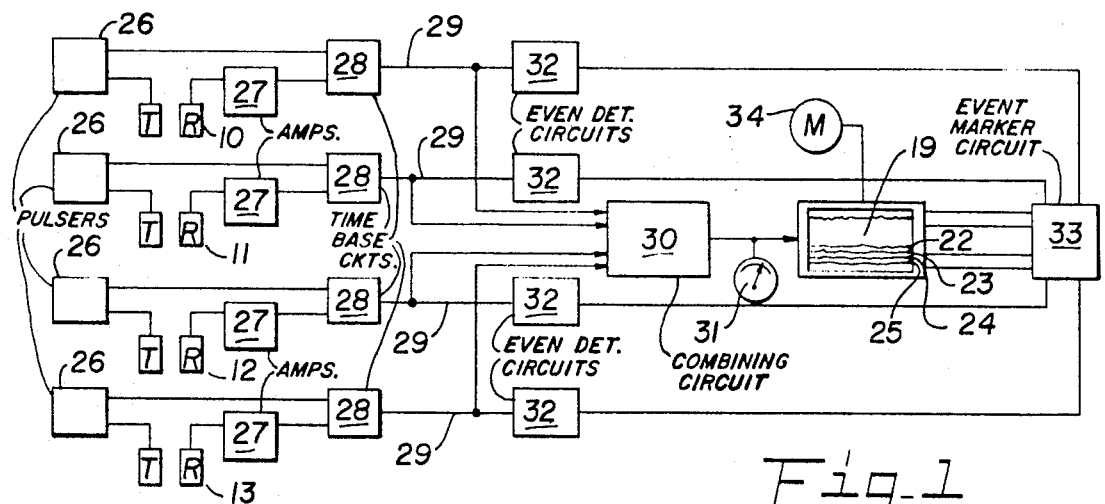
Figure 2:
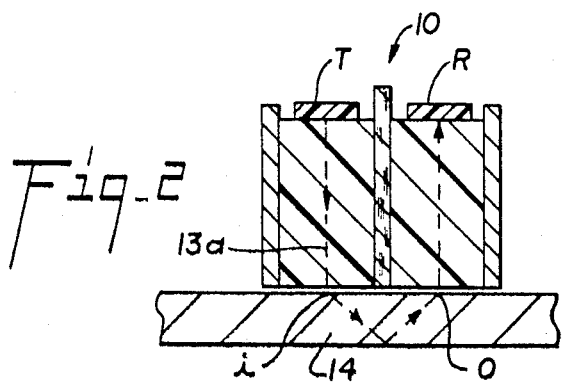
FIG. 2 is a sectional view of an ultrasonic transducer utilized in the system of this invention.

In the drawings, wherein a preferred embodiment of this invention is illustrated, FIG. 1 shows a block diagram of an ultrasonic inspection system utilizing a plurality of ultrasonic transducers 10, 11, 12, and 13 for inspecting a solid object, such as pipe. In the embodiment illustrated, each of the transducers 10 through 13 includes a transmitting element T which responds to an electrical inpulse to emit and conduct acoustical energy waves into an object being inspected which is placed adjacent the transducer, and a receiving element R which detects echo signals from an object being inspected. FIG. 2 illustrates a typical transducer for this application including a transmitting piezoelectric crystal element T and a receiving piezoelectric transducer element R. Acoustical energy signals are transmitted as illustrated to an object 14 being inspected and reflected back to a receiving piezoelectric crystal element $R_1$ as indicated by the dotted line 13a. The time lapse between the time an acoustic energy signal enters object 14 at point $i$ and then passes from object 14 at point $o$ is a function of the thickness of the object.

Figure 3:
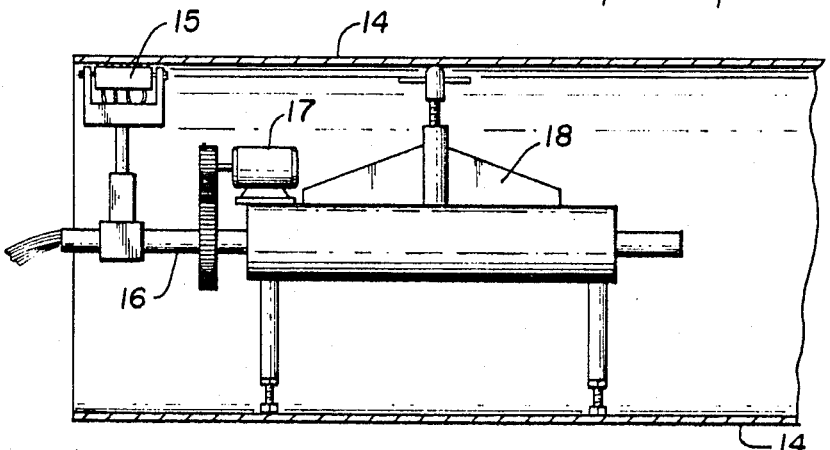
FIG. 3 is an elevational view of a portable inspection apparatus used in the system of this invention for the inspection of pipe and particularly pipe ends.

In the following description of this invention by reference to the preferred embodiment illustrated, reference will be made to the inspection apparatus illustrated in FIG. 3 which is particularly useful in inspecting large tubular members and more particularly the ends thereof. However, it is to be understood that the principles of this invention have broader application to ultrasonic inspection generally.

Figure 4:
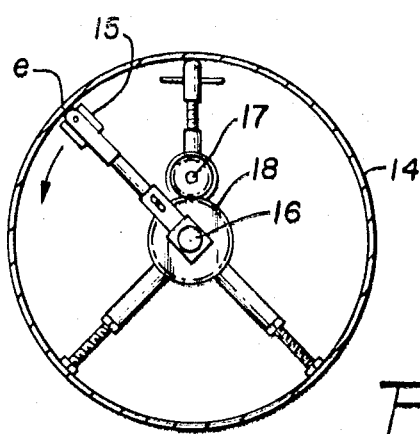
FIG. 4 is an end view of the apparatus shown in FIG. 3.

In the inspection by ultrasonic of large diameter pipe, use of the present invention permits the simultaneous inspection of adjacent circumferential bands of the pipe as it makes a rotational scan of the inside diameter of the pipe. As illustrated in FIG. 3, a suitable transducer housing 15 is mounted on a rotatable shaft 16 which is located substantially along the longitudinal axis of tubular member 14 being inspected. In this illustration, an end of tubular member 14 is being inspected. As illustrated by FIG. 4, housing 15 is rotated about shaft 16 along the inside wall of member 14 by a motor 17 or other suitable means. To facilitate inspection with the system of this invention, a portable stand 18 is preferably provided which can be inserted into the end of a large diameter tubular member to be inspected to support shaft 16 along the longitudinal axis of the member. A suitable stand for this purpose is illustrated in the copending application of Carl Smith, now abandoned assigned to the applicant of this application, Ser. No. 117,657, filed Feb. 22, 1971, and entitled "Device For Supporting A Rotating Shaft Within An Opening In Another Member." Of course, transducer housing 15 can be supported by other means; However, use of the portable stand 18 adds to the portability of the present system.

Another sample of such a support means which may be used is illustrated in U.S. Pat. No. 3,631,601.

By inspecting a plurality of ajacent circumferential bands of tubular member 14, complete inspection of the pipe end can be made by just one or a relatively small number of full rotations of shaft 16. This arrangement is permitted by mounting transducers 10 through 13 in housing 15 so that each inspect different circumferential bands $a$, $b$, $c$, and $d$ of tubular member 14, as illustrated in FIG. 5. As an example, the spacing between each of transducers 10 through 13 may be approximately 1½ inches between centers, thus permitting inspection of approximately a 6-inch wide portion of a pipe. the width of each of the adjacent sections inspected by one of the transducers can be varied to provide slight overlapping or can be wider than the inspection range of each of the transducers, the width of each of the bands being inspected depending primarily upon the length of the kind of discontinuities being encountered and the degree of discrimination desired in the results obtained.

Mounting of transducers 10 through 13 to permit simultaneous inspection of adjacent sections of the object also permits presentation on a multi-channel chart recorder 19 of easily understood information concerning the relative location and depth of any discontinuity encountered when inspecting object 14. Since each of transducers 10 through 13 are in line, a longitudinal crack, for example, such as illustrated by the line 20 in FIG. 5, would cause each of transducers 10 through 13 to indicate the presence of a discontinuity in each of their adjacent sections $a$ through $d$. Since each of the transducers is determining the relative wall thickness in each of the adjacent sections inspected, crack 20 would result in indication of different wall thickness in each of the sections, progressing from an indication of a thicker wall section in section $a$ to an indication of a thinner wall section in section $d$. Thus, by combining electrical signals, each of which is proportional to the wall thickness in one of the sections $a$ through $d$, the signal representing the thinnest wall in section $d$ can be recorded on a channel of chart recorder 19, represented by a stylus 21. Also, since the crack 20 is present in all the sections $a$ through $d$, separate indications provided by other channels of recorder 19, represented by styluses 22, 23, 24, and 25, can be provided to indicate the presence of a discontinuity in each of sections $a - d$. An important feature of this invention is the correlation, such as on chart recorder 19, of the information obtained concerning the wall thickness of crack 20 with the information concerning its presence or absence in each of the adjacent sections $a$ through $d$.

Referring again to FIG. 1, the electronic system for driving chart recorder 19 to provide the correlation referred to is illustrated. Each of the transducers 10 through 13 is pulsed by an electronic pulser 26 at the transducer frequency, and the echo signals from the receiving elements of each of the transducers are received and amplified by an amplifier 27. A time measurement circuit 28 is connected to each of the pulsers 26 and to each of the amplifiers 27. Each of the time circuits 28 provides an output on lines 29, each of which has an electrical analog value proportional to the wall thickness of the object being inspected in one of adjacent sections $a - d$. A suitable electronic circuitry for providing such analog signals in the present system is illustrated in the copending patent application of Jerry L. Jackson entitled "Time Base Measurement Circuit," Ser. No. 117,663 which is assigned to the applicant of this invention and was filed Feb. 22, 1971. Other examples of suitable electronic circuitry which may be used with this invention are found in U. S. letters Pat. Nos. 3,427,866 and 3,454,922.

Also, my copending patent application entitled "Ultrasonic Inspection Apparatus" Ser. No. 117,677, filed Feb. 22, 1971 illustrates a transducer mounting assembly which provides for the in-line mounting of a plurality of transducers to permit simultaneous inspection of adjacent sections. This arrangement is schematically illustrated in FIGS. 3 and 5 of this application. Other examples of mounting assemblies for the transducers which may be used with this invention are found in U. S. letters Pat. Nos. 3,019,636 and 2,875,607.

Referring again to FIG. 1, each of the analog signals on lines 29 are conducted to the inputs of a combining circuit 30 which responds to either the smallest in amplitude or the largest in amplitude of the signals received on lines 29 to provide an analog output proportional to or equal to the largest or smallest signal to which it responds. A suitable electronic circuit for this application is also disclosed in the copending application of Jerry L. Jackson, previously mentioned. The output of circuit 30 is conducted then to channel 21 of chart recorder 19 and also to a high impedance voltage meter 31 to provide a continuous reading of the conditions of the wall thickness of object 14 as it is being inspected.

Figure 8:
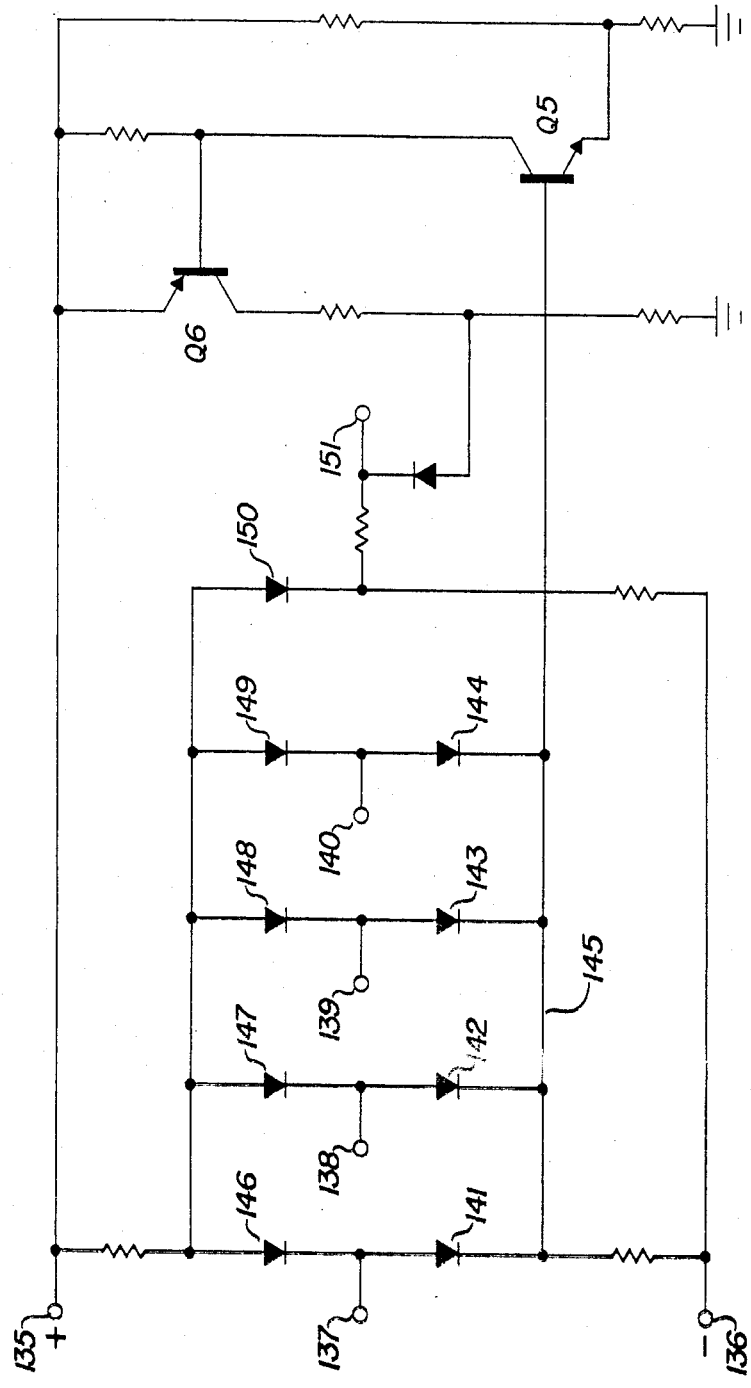
FIG. 8 is a schematic diagram of a combining circuit that may be used with this invention.

FIG. 8 illustrates a form of the circutiry of combining circuit 30 for providing an output signal in response to the smallest amplitude signal received on line 29, or, in some instances, the largest of such signals. Thus, with a plurality of inspection transducers being utilized to simultaneously inspect adjacent sections of an object being inspected, and provide a plurality of electrical signals on lines 29, each proportional to the wall thickness of the object being inspected in one of said adjacent areas, then the signals can be combined by utilizing the circuit illustrated in FIG. 8 to provide an analog signal generally proportional to the smallest of these signals, so that the thinnest wall section will be recorded at any point along the inspection. The circuit in FIG. 8 is illustrated as including four strings of two series-connected diodes connected at terminals 135 and 136 between sources (not shown) of equal voltages of opposite polarity, and input terminals 137, 138 139 and 140 are connected for receipt of suitable voltage signals, such as from lines 29, to the junction of each of the series-connected diodes. Diodes 141 through 144 are connected on the negative side of the diode strings by a common lead 145, and diodes 146 through 148 are connected to the positive side of the diode strings by a common lead 149. Current flows from lead 149 to lead 150 through the diode strings. Since each of the inputs 137 through 140 is connected between two of the series-connected diodes, the lowest negative input voltage at one of the inputs to the diodes will determine the voltage at line 149. This voltage is then conducted through a diode 150, which compensates for the loss of voltage in the circuit described, to an output terminal 151. Thus, the voltage at output terminal 151 will be proportional to the smallest of the signals received at inputs 137 through 140.

Line 145 is also connected to the base of a transistor Q5. Thus, if the signal level at one or more of the inputs 137 through 140 is of sufficient value, Q5 will conduct, and the voltage level at output 151 will change to a predetermined higher level determined by a voltage control circuit including transistor Q6 and associated components. This high level signal can be used to indicate, for example, the presence of a weld on an object being inspected. Thus, by proper setting of the threshold level of transistor Q5, the circuit of FIG. 8 can be made to respond to the smallest of the received signals, when all of these signals are below a preset level, and provide an indication of a relatively higher level input when one or more of the received signals exceeds this preset level. In the latter case, for example where a weld bead is present (level H in FIG. 6) an indication of the largest signal on line 29 would be provided.

Each line 29 is also connected to the input of one of a plurality of event determination circuits 32, which may be level detector circuits set to provide an output only when the level of the analog signal on line 29 deviates from a nominal value by a certain amount, for example, 10 percent. Any type of voltage threshold detectors, which are well known in the art, as illustrated by reference to threshold detector 17 in U.S. letters Pat. No. 3,522,580, may be used. Thus, if the normal wall thickness of object 14 is 400 mils, then circuits 32 may be set so that they produce an output when the value of one or more of the analog signals on line 19 indicate a wall thickness of less than 360 mils, or greater than 440 mils. The output of each of circuits 32 is then conducted to operate one of styluses 22 – 25 of chart recorder 19. Since it is only necessary to mark the chart medium to indicate the presence of the discontinuity, and not to indicate a value proportional to the discontinuity, an event marker circuit 33, which may be a very low frequency oscillator, can be provided to drive styluses 22 – 25 to indicate or mark, as shown in FIG. 7.

FIGS. 6 and 7 indicate the type of graphical representation which can be provided by this invention. In FIG. 6 line 60 represents a value of the analog signal from the output of combining circuit 30 and is generally proportional to the smallest of the signals appearing on lines 29. For the purpose of recording this signal as a function of the thickness being inspected, the recording medium 35 of chart recorder 19 can be marked off in a measurement of thickness, for example, from 0 to 400 mils, where 400 mils represents a normal wall thickness of the object being inspected. Also, the speed of rotation of a motor 34 driving the recording medium in recorder 19 can be synchronized with the speed of rotation of motor 17 rotating shaft 16 so that the position of a mark on line 60 along the chart paper can be correlated with the position of housing 15 during its rotational inspection of member 14. Thus, for example, position e shown in FIG. 4 on the circumference of the inner wall of member 14 can be represented by a similar position e on line 60.

Also, in the embodiment described, since the output of each of event determination circuits 32 are connected to separate channels of recorder 19, a deviation in wall thickness greater than 10% will simultaneously be recorded on line 60 and on one of lines 61, 62, 63, and 64, each representing separate channels of recorder 19. For example, referring to FIGS. 1, 6, and 7, the output of circuit 32 responding to receipt of echo signals from transducer 10 to control connected tocontrol stylus 22 to provide distinctive marks on line 61, the output of circuit 32 responding to receipt of echo signals by transducer 11 is connected to control stylus 23 to provide distinctive marks on line 62, the output of circuit 32 responding to the receipt of echo signals by transducer 12 is connected to control stylus 24 to provide distinctive marks on line 63, and the output of circuit 32 responding to receipt of echo signals by transducer 13 is connected to control stylus 24 to provide distinctive marks on line 64.

Referring to FIG. 6, for purposes of illustration, it can be assumed that the level A on line 60, shown at 400 mils, represents normal wall thickness, and that the level B on line 60 is representative of a lamination in the wall of member 14. As illustrated by the presence of marks B' on lines 62 and 63 in line with level B on recording medium 35, lamination B occurs only in sections b and c of the inspected portion of member 14 and is slightly wider (i.e., along the circumference of member 14) in section b than in section c. Level C of line 60 in FIG. 6 represents a crack in member 14 which extends all the way through the member, as indicated by being substantially zero and, as illustrated by mark C' on lines 61 – 64, is present in all of sections a through d. Level D in FIG. 6 represents a thick wall section which appears in sections a through c of the portion of member 14 inspected, and its width in each of the sections can be determined by the width of marks D' on lines 61, 62, and 63.

Level F on line 60 represents a thin wall section which appears in sections b, c, and d and is narrow in section b and wider in section d. Again this can be determined by comparing the marks F' on lines 62 – 64 with the level of F on line 60, both of which occurs at the same time on recording medium 35. Level H is greater than the normal wall thickness of 400 mils, and this level in conjunction with levels G and I represents a longitudinal weld in the pipe. The marks G' and I', which appear in all four sections *a* through *d* and are substantially the same width in each section, represent the edge of the weld, and level H represents the increased wall thickness resulting from the weld. Similarly, levels J, K, and L also may represent a weld which, however, has a bubble in it so that there is a discontinuity in the weld. Again, the marks J' and I', which appear in all of the sections *a* through *d*, represent the edge of the weld and the center of the weld is represented by the level K and marks K'; and since the discontinuity appears only in sections *b* and *c*, this is where the bubble would be found. Since each of the sections *a – d* is at a known distance from the end of a member being inspected, and the rotational position of the housing 15 is provided by, for example, one of lines 65 on chart 35, then the actual location of a discontinuity on member 14 is provided.

FIG. 7 illustrates the results of an actual test made by the system of this invention of a 36-in. O.D. steel pipe. The inspection began with a long run of normal wall thickness, as indicated by the left section of the chart 35 with the straight line 60 at 400 mils and the lack of presence of any discontinuities on event marking lines 61 through 64. However, as represented by the right-hand portion of chart 35, a large discontinuity in all four of the adjacent sections being inspected resulted in line 60 going to the level M, indicating a minimum wall thickness at that point of the inspection of about 150 mils. Also each of lines 61 through 64 was marked; however, the width of these lines varied, indicating variation in the width of the discontinuity in each of the adjacent sections being inspected. As illustrated by FIG. 7, the width of discontinuity M is relatively narrow in section *a* and progressively becomes wider as shown by the greater width in section *d*. Thus, it can be seen that the combination of the wall thickness measurement given by line 60 and the event markings given by lines 61 through 64 provides a graphical picture of the defect, and since the movement of chart recorder 21 and shaft 51 are synchronized, the location of the defect on the circumference of the member being inspected, its relative width in each of the sections being inspected, and its relative thickness in one or more of the sections being inspected can be readily determined.

From the foregoing, it can be seen that this invention is one well adapted to attain all of the ends and objects hereinabove set forth, together with one advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. An ultrasonic inspection system comprising in combination: a plurality of ultrasonic transducers for transmitting and receiving ultrasonic energy signals; means mounting said transducers adjacent an object to be inspected to permit simultaneous inspection of adjacent sections of such an object; impulse means connected to drive said transducers to provide transmitted ultrasonic energy signals to such an object being inspected; a plurality of time measurement means each connected to said inpulse means and to one of said transducers to provide a plurality of electrical signals each proportional to a thickness of the object being inspected at one of said adjacent sections; and indicating means connected to each of said time measurement means and including a plurality of event indicating means each responding to only one of said electrical signals to indicate the presence of discontinuities in any separate adjacent section, each such event indicating means providing such an indication when the level of its respective only one of said electrical signals deviates a predetermined amount from the level of such a signal representing normal wall thickness in the respective adjacent section, and thickness indicating means responding to each of said electrical signals to provide an indication of a thickness in at least one of said adjacent sections.

2. The system of 1 further including means for synchronizing said event indicating means and said thickness indicating means to permit each to be compared with a relative position on the object being inspected.

3. The system of claim 1 wherein said thickness indicating means is an analog chart recorder.

4. The system of claim 3 wherein said event indicating means further is an event chart recorder including a plurality of recording channels each connected to one of said time measurement means, each channel responding to one of said electrical signals of predetermined magnitude to provide a graphical display of discontinuities in one of said adjacent sections.

5. The system of claim 4 further including means for synchronizing the operation of said analog recorder and said event recorder to permit comparison on a time base of the presence of discontinuities with relative thickness.

6. The system of claim 5 wherein said analog recorder and said event recorder comprise one chart recorder having a plurality of recording channels, one of said channels being used as an analog recorder.

7. An ultrasonic inspection system for inspecting tubular members comprising, in combination: portable means insertable into a tubular member to be inspected and supporting a rotatable shaft along the longitudinal axis of such a tubular member; an ultrasonic inspection apparatus connected to said shaft to rotate about the inside diameter of such a tubular member, said inspection apparatus including a plurality of ultrasonic transducers for simultaneously inspecting adjacent circumferential bands of such a tubular member as the apparatus is rotated by said shaft; means responding to the output of each of said transducers to provide a plurality of electrical signals each being proportional to a thickness in the wall of one of said circumferential bands; and recording means responding to each of said electrical signals to provide a recordable indication of the condition of the tubular member in the circumferential bands being inspected, said recording means including thickness recording means; and means for combining and responding to each of said electrical signals and connected to said thickness recording means to provide a recordable indication proportional to the smallest of said electrical signals.

8. The system of claim 7 wherein said recording means further includes a plurality of event recording means; and further including level detector means responding to each one of said electrical signals when greater than a predetermined difference from the value of such an electrical signal representing substantially normal wall thickness of the member being inspected, to provide a distinctive recordable indication.

9. The system of claim 8 further including means for synchronizing the operation of said thickness recording means and said event recording means to permit the indications from each to be correlated with a circumferential position at which they occur on said tubular member.

* * * * *